(12) United States Patent
DeLaquil et al.

(10) Patent No.: US 8,166,090 B2
(45) Date of Patent: Apr. 24, 2012

(54) TILED ARCHITECTURE FOR STATIONARY-METHOD ITERATIVE LINEAR SOLVERS

(75) Inventors: Matthew Pascal DeLaquil, Rockwall, TX (US); Deepak Prasanna, Rockwall, TX (US); Scott Michael Burkart, Royse City, TX (US); Joshua D. Anderson, Dallas, TX (US); Antone Lee Kusmanoff, Greenville, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 1151 days.

(21) Appl. No.: 11/966,633

(22) Filed: Dec. 28, 2007

(65) Prior Publication Data

US 2009/0172052 A1    Jul. 2, 2009

(51) Int. Cl.
*G06F 7/38* (2006.01)
(52) U.S. Cl. ........................................ 708/446
(58) Field of Classification Search ............... 708/446
See application file for complete search history.

(56) References Cited

U.S. PATENT DOCUMENTS

| | | | | |
|---|---|---|---|---|
| 5,301,342 A | * | 4/1994 | Scott | 711/111 |
| 5,319,586 A | * | 6/1994 | Gupta et al. | 708/446 |
| 5,717,621 A | * | 2/1998 | Gupta et al. | 708/446 |
| 7,065,545 B2 | * | 6/2006 | Quintero-de-la-Garza | 708/446 |

* cited by examiner

*Primary Examiner* — Tan Mai
(74) *Attorney, Agent, or Firm* — Hovey Williams LLP

(57) ABSTRACT

A system for solving linear equations comprises a first circuit including a first multiplication module for multiplying a first row of a matrix by a first instance of a vector variable to generate a first product, and a first linear solver module for calculating an updated first element of the vector variable using the first product. A second circuit includes a second multiplication module for multiplying a second row of the matrix by a second instance of the vector variable to generate a second product, and a second linear solver module for calculating an updated second element of the vector variable using the second product. An interface module updates the second instance of the vector variable with the first updated element, and updates the first instance of the vector variable with the second updated element.

18 Claims, 5 Drawing Sheets

TILED ARCHITECTURE FOR STATIONARY-METHOD ITERATIVE LINEAR SOLVERS

BACKGROUND

1. Field

The present invention relates to systems and methods for solving linear equations. More particularly, embodiments of the invention involve a distributed and scalable architecture for iteratively solving sets of linear equations.

2. Description of Related Art

In various fields of engineering and science it is often necessary to work with very large matrix equations, such as Ax=b where A is an n×n matrix, b is a known n-vector, and x is an unknown n-vector. Exemplary disciplines that require solutions to matrix equations are computational fluid dynamics, electromagnetics geophysical exploration, economics, linear programming, astronomy, chemistry, and structural analysis, to name a few. Solving large matrix equations is computationally expensive, particularly where the matrix A above comprises millions or tens of millions of rows.

Solving the equation Ax=b set forth above for the unknown vector x may involve, for example, iteratively calculating approximations of each value of the vector x, wherein the approximated values of x gradually converge on a solution to the equation. This approach requires performing repeated calculations, which requires a great deal of time where the matrix A comprises millions or tens of millions of rows of data.

Accordingly, there is a need for an improved method of solving linear equations that does not suffer from the problems and limitations of the prior art.

SUMMARY OF THE INVENTION

The present invention provides an improved system and method for solving linear equations that does not suffer from the limitations of the prior art. Particularly, embodiments of the invention provide a system for solving a set of linear equations that uses a distributed and scalable architecture for concurrently and iteratively solving individual equations of the set.

In various embodiments, the present technology provides a system including a first circuit, a second circuit, and an interface module. The first circuit includes a first multiplication module for multiplying a first row of a matrix by a first instance of a vector variable to generate a first product, and a first linear solver module for calculating an updated first element of the vector variable using the first product, wherein the first element of the vector variable corresponds to the first row of the matrix.

The second circuit includes a second multiplication module for multiplying a second row of the matrix by a second instance of the vector variable to generate a second product, and a second linear solver module for calculating an updated second element of the vector variable using the second product. An interface module updates the second instance of the vector variable with the first updated element, and updates the first instance of the vector variable with the second updated element, wherein the second element of the vector variable corresponds to the second row of the matrix.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Preferred implementations of the present technology are described in detail below with reference to the attached drawing figures, wherein.

DETAILED DESCRIPTION

The following detailed description of the present invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present teachings. The following detailed description is, therefore, not to be taken in a limiting sense. The scope of the present invention is defined only by the appended claims, along with the full scope of equivalents to which such claims are entitled.

Figure 1:
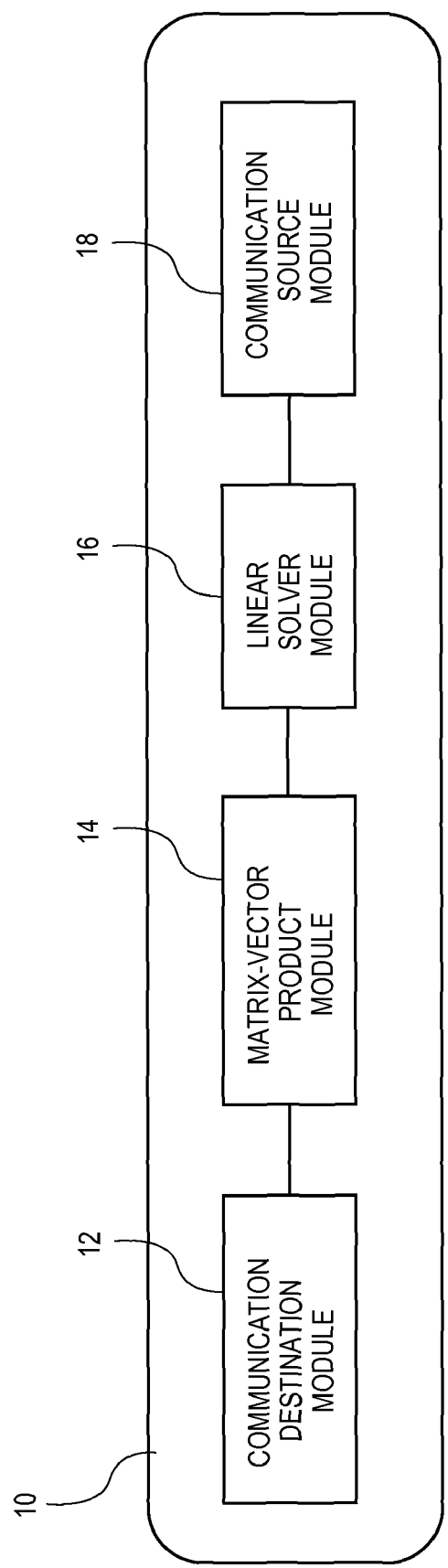
FIG. 1 is a block diagram of an exemplary circuit for use in solving systems of linear equations according to principles of the present teachings, wherein the circuit solves a single row of the matrix equation A=b for an estimated x value.

A circuit embodying various principles of the present invention is illustrated in FIG. 1 and designated generally by the reference numeral 10. The circuit 10 generally includes a communication destination module 12, a matrix-vector product module 14, a linear solver module 16, and a communication source module 18.

The circuit 10 may be used in solving linear equations, such as equation (1):

$$Ax=b, \qquad (1)$$

wherein A is an n×n matrix, b is a known vector of size n, and x is an unknown vector of size n. In particular, the circuit 10 may be used to iteratively solve a single row of matrix A for an estimated value of x, and a plurality of instances of the circuit 10 may be used to cooperatively and concurrently solve all rows of the matrix A for all values of the vector x, as explained below.

The communication destination module 12 and the communication source module 18 of the circuit 10 provide an interface between the circuit 10 and one or more external circuit elements, such as other instances of the circuit 10, communications controllers, and so forth. The communication destination module 12 and the communication source module 18 are described below in greater detail.

Figure 2:
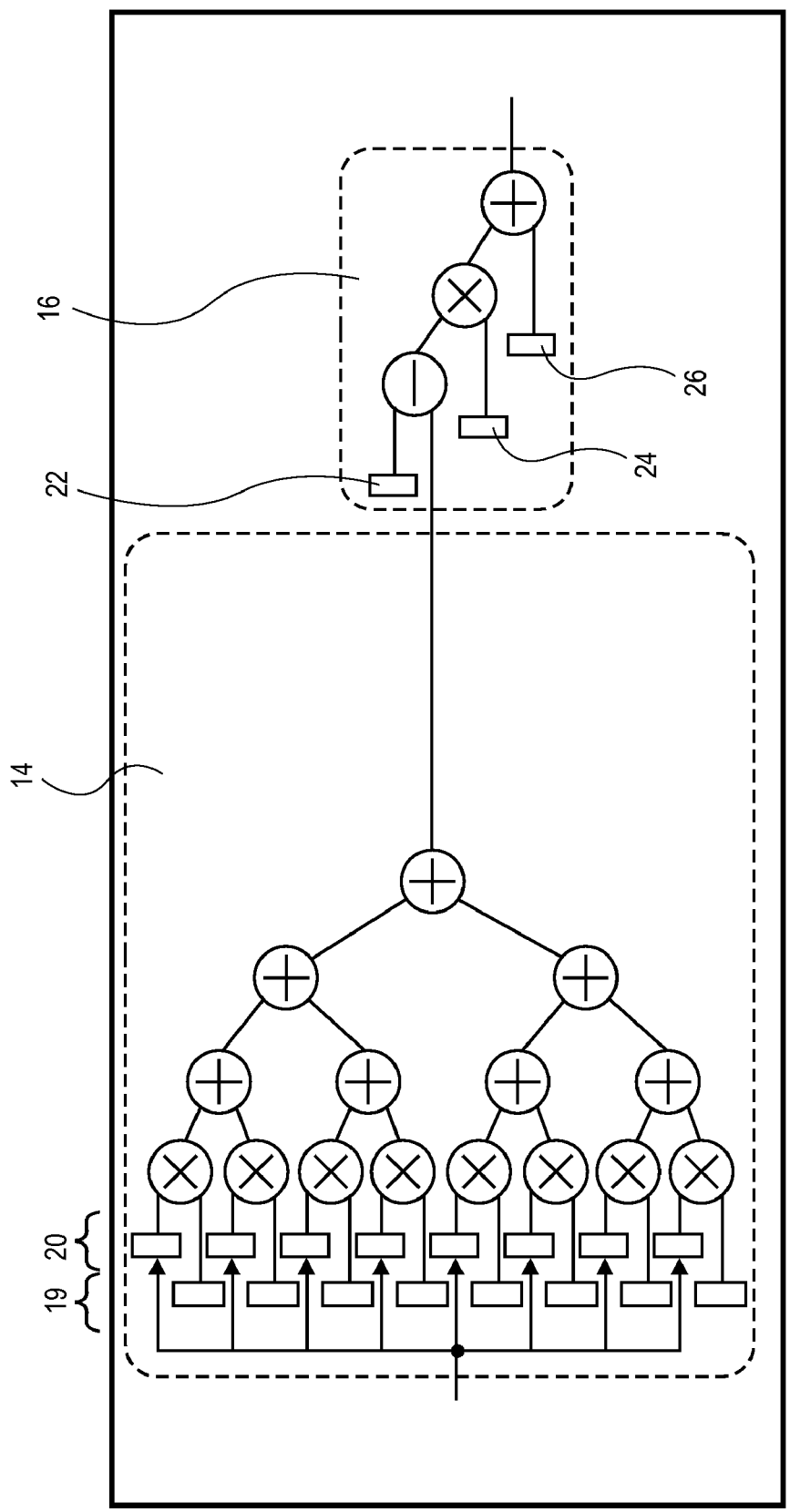
FIG. 2 is block diagram illustrating the functionality of a matrix-vector product module and a linear solver module of the circuit of FIG. 1.

The matrix-vector product module 14 generally multiplies an instance of the vector variable x by a row of the matrix A, and the linear solver module 16 generally estimates a new value of the unknown vector x. Exemplary embodiments of the matrix-vector product module 14 and the linear solver module 16 are illustrated in greater detail in FIG. 2, and generally are operable to solve equation (2) for the variable $X_{r\_next}$ as follows:

$$x_{r\_next} = x_r + \frac{1}{D}\left(b_r - \sum A_r x\right) \quad (2)$$

where $A_r$ is a single row of an n×n matrix A, D is a diagonal value of the matrix row $A_r$, $b_r$ is a value of a known vector of size n wherein $b_r$ corresponds to the row $A_r$, x is an unknown vector of size n whose value is estimated by equation (2), $x_r$ is a single value of the vector x previously estimated using equation (2), and $x_{r\_next}$ is a new or updated value of $x_r$. Thus, the portion of equation (2) to the right of the "+" sign represents $\Delta x_r$, or an incremental change in the estimated value of $x_r$, and the value $x_{r\_next}$ replaces the value $x_r$ in a subsequent iteration of equation (2).

The matrix-vector product module 14 of the circuit 10 calculates the value $\Sigma A_r x$ by multiplying each value of $A_r$ by a corresponding value of x and summing the results. By way of example, each of the values of $A_r$ may be stored in a first memory bank 19, and each of the values of x may be stored in a second memory bank 20. Where multiple instances of the circuit 10 are used (as set forth below), each circuit 10 may have a unique memory bank 20 holding an instance of the vector variable x.

The second memory bank 20 receives updated x values from the communication destination module 12. One of the values of the vector x in the second memory bank 20 corresponds to $x_r$ calculated by the circuit 10, while each of the remaining values of the vector x in the second memory bank 20 is calculated by other circuit elements similar or identical to the circuit 10. All of the x values are preferably updated asynchronously and in real time. In other words, each time a new value of $x_r$ is calculated by the circuit 10, it is automatically asynchronously communicated, via the communications modules 12,18, to the second memory bank 20 and corresponding memory banks of all other similar circuits.

As explained above, the value communicated to the linear solver module 16 from the matrix-vector product module 14 is the sum $\Sigma A_r x$. The linear solver module 16 subtracts the sum $\Sigma A_r x$ from a value of the known matrix b corresponding to the row $A_r$, wherein the value of b is stored in a first memory element 22, and multiplies that result by the value $D^{-1}$ stored in a second memory element 24, wherein $D^{-1}$ is the inverse of the diagonal of the matrix row $A_r$. Finally, that result is added to the value $x_r$ to generate the value $x_{r\_next}$, which is communicated to the communication source module 18 and ultimately to the second memory bank 20. Thus, to perform the calculations, the circuit 10 only needs values corresponding to a single row of the matrix A and a previous $X_r$ value estimated by the circuit 10. Thus, the circuit 10 is a "stationary" linear solver.

Figure 3:
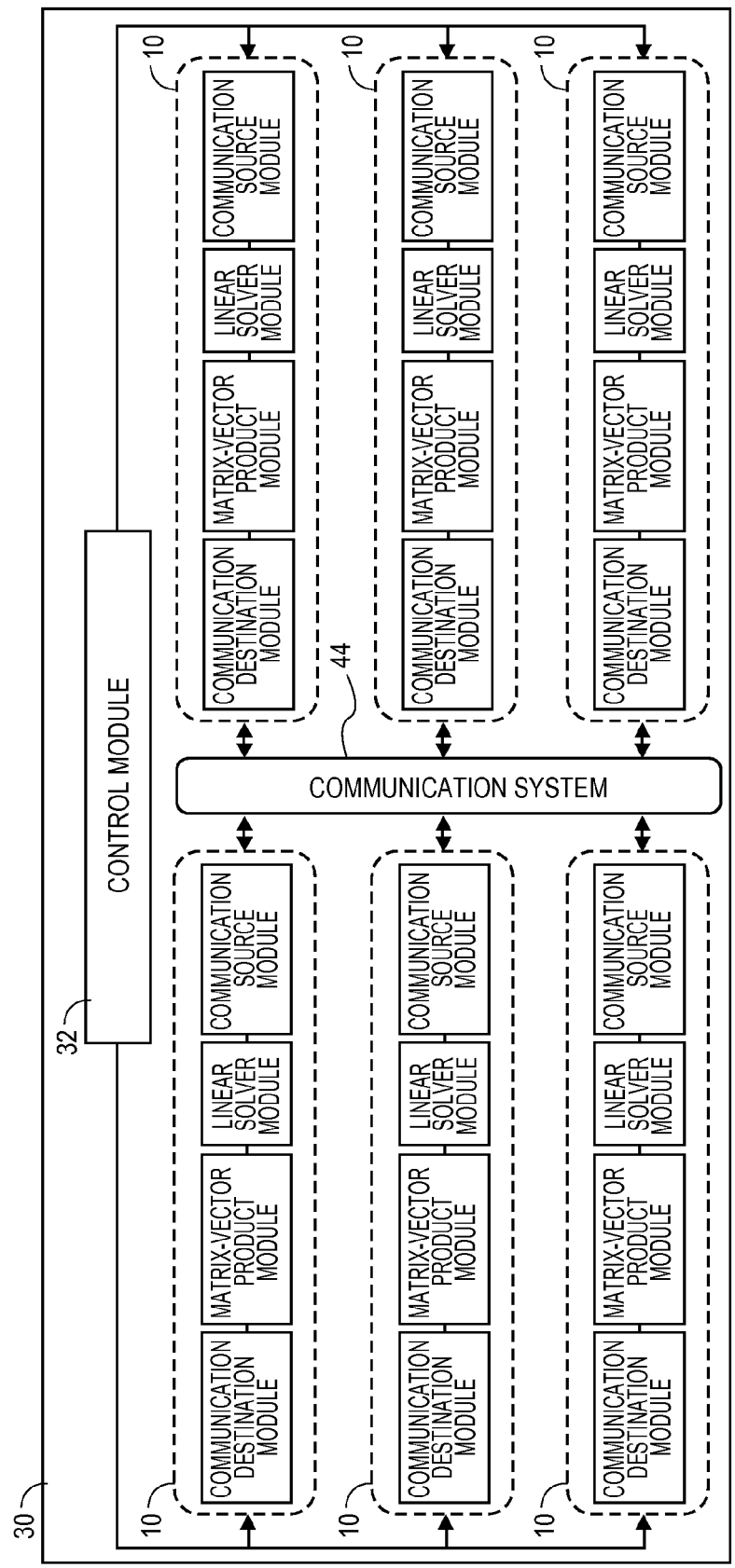
FIG. 3 illustrates a plurality of the circuits of FIG. 1 located on a single device and interconnected via communications modules and associated with a control module.

Referring also to FIG. 3, multiple instances of the circuit 10 may be implemented to solve equation (2) above, wherein each instance of the circuit 10 is used to repeatedly solve a single row of the matrix A. In the system 30 of FIG. 3, for example, there are six instances of the circuit 10, therefore the system 30 could be used to solve up to six linear equations simultaneously, such as the equation Ax=b where A is a 6×6 matrix. The control module 32 may control such functions as, for example, storing the values corresponding to each row of matrix A in different circuits 10 and storing the values of b and $D^{-1}$ in the memory elements 22,24 in each of the circuits 10.

Furthermore, the system 30 may be used to solve matrix equations involving matrices much larger than 6×6, wherein the control module 32 feeds a first subset of linear equations through the system 30, then subsequently feeds a second subset of linear equations through the system 30 until all rows of the matrix have been processed. The control module 32 may iteratively process all subsets of linear equations in this manner until a solution has been reached.

The control module 32 and the communication system 44 enable the creation of a scalable system capable of utilizing as little as a few instances of the circuit 10 to as many as millions of instances of the circuit 10. For example, in various embodiments of the invention, the communication system 44 provides a communication interface between instances of the circuit 10 that includes a packet router, as explained below, that is used in the same manner by each instance of the circuit 10 regardless of weather there are five instances of the circuit 10 on a single device or many instances of the circuit 10 across a plurality of devices. The system 30 may be implemented on a single device or "chip."

Figure 4:
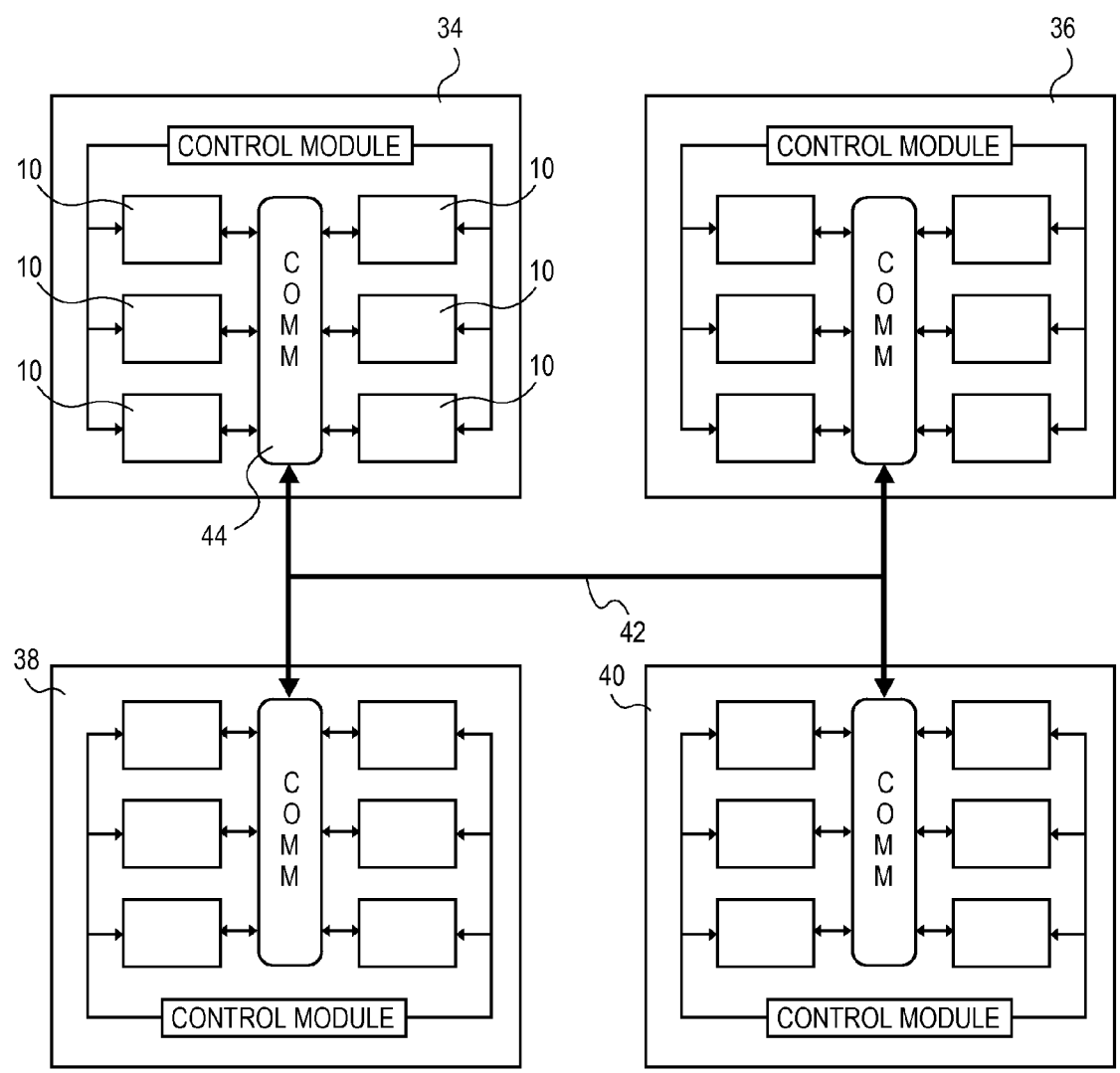
FIG. 4 illustrates a plurality of the devices of FIG. 3 located on a circuit board and interconnected via a communications system.

Referring particularly to FIG. 4, a plurality of separate devices 34,36,38,40 such as field programmable gate arrays (FPGAs) or application specific integrated circuits (ASICs) may be interconnected via the communication system 44 and a communications medium 42. Each of the devices 34,36,38, 40 may by similar or identical to the system 30 as described above. The communication system 44 may partially or entirely comprise each communication destination module 12 and each communication source module 18, and may enable communication within each device 34,36,38,40 as well as across devices.

Figure 5:
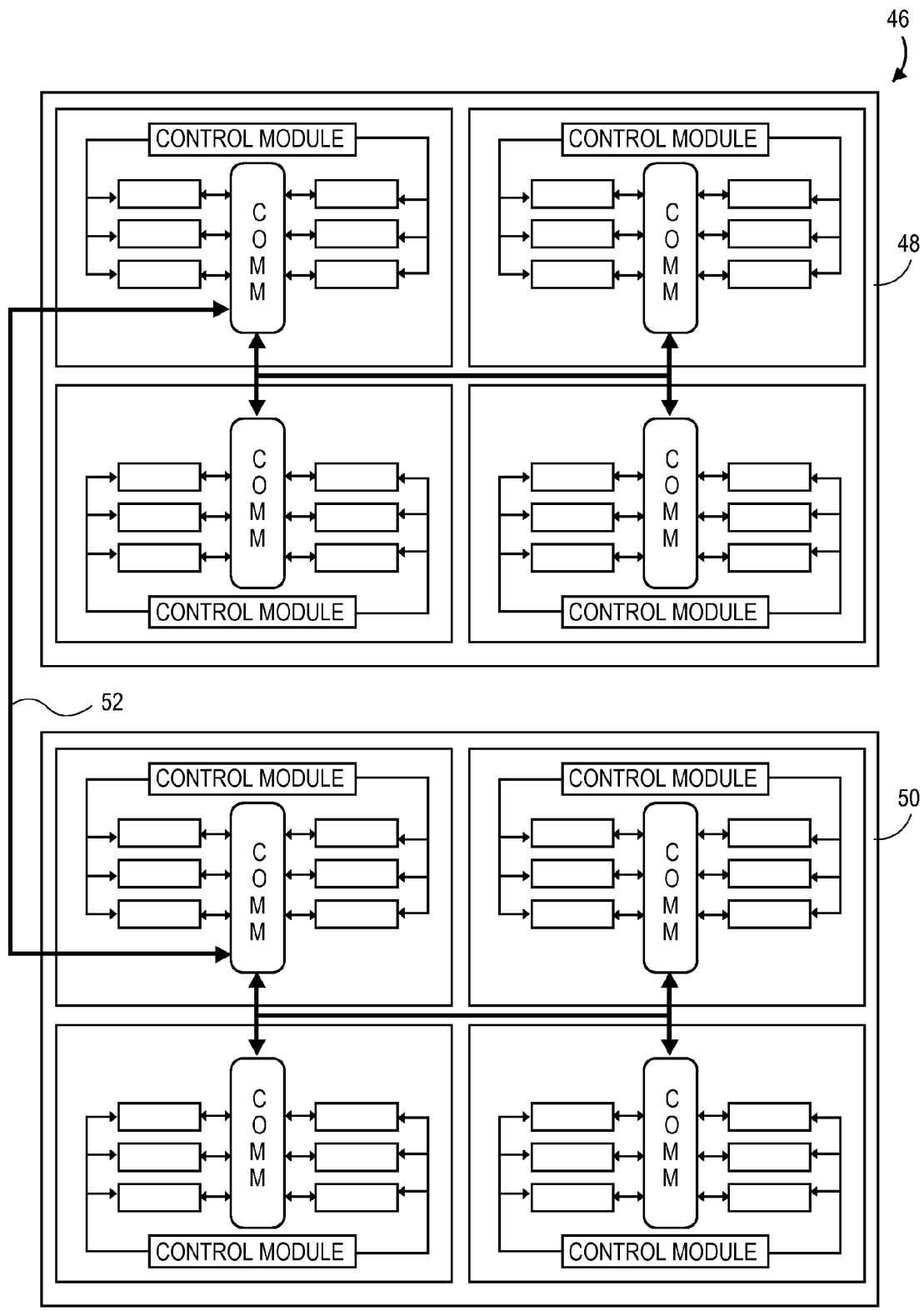
FIG. 5 illustrates a plurality of the circuit boards of FIG. 4 interconnected via the communications system.

Referring to FIG. 5, a system 46 includes a plurality of circuit boards 48,50 each containing a plurality of the devices similar to the devices 34,36,38,40 described above. Each of the circuit boards 48,50 may be similar or identical to the circuit board 30, and are interconnected via a communications medium 52, such as a wired or wireless network connection or dedicated communications link. Thus, various devices each implementing one or more of the circuits 10 may each be located on separate circuit boards or systems and/or separated by a substantial distance, such as where the devices are located at various places on a vehicle, such as an airplane, or are located at disperse geographic locations.

The communications system 44 on each device enables communication between instances of the circuit 10 located on each device, across devices, and across boards. The type of communication involved (within a device, across devices, or across boards) may be transparent to each instance of the circuit 10.

The communication system 44, including the communication destination module 12 and the communication source module 18, may include a packet router on each of the devices and a high bandwidth interconnection medium coupling the packet routers to form a reconfigurable communications infrastructure. The high bandwidth interconnection medium may include, for example, a direct serial interconnection between each of the packet routers or a shared serial connection. More particularly, the communications system may interconnect multiple devices using simplex and/or duplex serial I/O connections, including high speed serial connections, such as multi-gigabit serial transceiver ("MGT") connections. In various embodiments of the invention, serial I/O connections are employed to interconnect a pair of devices to create a low signal count connection. For example, in one exemplary embodiment, high speed serial I/O connections, such as MGT connections, may be employed to interconnect a pair of devices to create a high bandwidth, low signal count connection.

In various embodiments of the invention, any given pair of multiple devices on a single circuit board, such as a circuit card, such as three or more devices present as a device array on a single circuit board, may be interconnected by one or more serial data communication links (simplex and/or duplex serial data communication links formed between respective serial I/O connections of a given pair of devices) so that the given pair of devices may communicate with each other through the two serial I/O connections of each of the serial data communication links with no other serial connection intervening in between, or in other words, in a "one-step" fashion. Such a capability may be implemented, for example, such that each embedded processor, processor node, card level-interface, user-defined hardware module, or similar component is provided with access to each of the other such entities on the card through one or more separate respective "one step" data communication links that each includes no more than two respective serial connections coupled together (for example, no more than two respective high speed serial connections coupled together) in the data communication path and through a minimum number of packet transfer points.

In a further embodiment, such a data communication link may be further characterized as a "direct serial interconnection" between two such entities, meaning that no multi-port switch device, such as a crossbar switch or similar component, exists in the serial data communication path between the boundaries of the two entities. Advantageously, the communication system 44 may be so implemented in one embodiment to achieve communication between given pairs of devices with relatively high data transfer bandwidths and minimal wiring. Furthermore, the communication system 44 may be utilized to establish a communications infrastructure across multiple circuit boards or cards.

In various embodiments, the communication system 44 may be configured to include packet-based communications infrastructures that use high-bandwidth switch fabric packet routers to establish standard communications protocols between multiple interfaces and/or multiple devices that may be present on a single circuit board. Such a system may be further configured in various embodiments to provide a useful communications framework that promotes commonality across multiple signal processing applications without restricting user utility. For example, packets conforming to a given interface may be processed by stripping a packet header and then routing the remaining packet between devices using the standardized packet router infrastructure. Advantageously, such a device may be implemented in a manner that does not preclude the addition of high-performance user connectivity, for example, by only using a relatively small fraction of the available serial I/O connections and device gate resources. In various embodiments, embedded serial I/O connections, such as embedded MGT connections, of multiple devices may be used to interconnect the devices in a manner that advantageously reduces on-card I/O counts and the need for large numbers of termination components. However, it will be understood that non-embedded serial I/O connections may also be employed in the practice of the disclosed systems and methods.

According to various exemplary embodiments of the invention, multiple devices of a device array may be coupled together on a single circuit board to communicate at the board-level basis using packet routing through one or more switch fabrics, for example, crossbar switches. In such an embodiment, each given pair of devices of a device array may be linked in a manner that advantageously minimizes packet transfer latency times in the switch fabric, while at the same time allowing every source to have access to every destination in the array. In such a configuration, a universal bridging method may be used in each device to allow intercommunication between any two processors/interfaces on a single circuit board. In various embodiments, the bridging method may be implemented with a First-In First-Out ("FIFO") packet relay protocol that may be readily integrated into or mapped onto the slave functionality of standard interfaces and/or processor buses.

Thus, the communication system 44 may be implemented using a predictable and uniform or standardized interface across the boundaries between each pair of board-level components. Further, built-in support for packet integrity checking and automatic retransmission of bad packets may be provided to facilitate the usage of the inter-device links with hardware modules, and may be incorporated into the hardware layer such as physical layer one of the Open System Interconnection ("OSI") protocol, so that data may be transferred between hardware devices using a packet integrity checking method that is handled automatically by the hardware without the need for an upper layer of software to perform the packet integrity checking. For example, packet integrity protocol tasks may be built into interface/interconnection hardware present in a data communication link between devices.

The communication system 44 may be implemented to interconnect devices using high bandwidth interconnection mediums. The reconfigurable communications system may be implemented not only to interconnect devices that are provided on a single circuit board or circuit card, or that are provided within a single electronics chassis (e.g., provided on separate circuit cards within the same electronics chassis), but also to interconnect devices that are positioned in locations that are physically segregated from each other (e.g., that are positioned in different electronics chassis, positioned in different rooms of a given building or facility such as a military base, stationary oil and gas platform, shopping mall, or office building, positioned in different compartments of a given mobile vehicle such as an aircraft, truck and/or trailer, spacecraft, submarine, train, boat, mobile oil and gas platform, etc., and/or that are positioned at different locations using ports across a wide-area network such as the Internet, wireless networks, public telephone system, cable television network, satellite communications system, etc.).

For example, in various embodiments, a reconfigurable communications infrastructure may be provided to project a reconfigurable network across a wide area. Such a reconfigurable communications infrastructure may be provided, for example, to interconnect physically segregated devices in a standard and reconfigurable manner. Such an embodiment may be implemented to allow such computing devices to be used in a variety of different arrangements and applications, such as for use in any application where a large array of devices may be usefully employed such as supercomputing. To enable interconnection of physically segregated devices, high bandwidth interconnection mediums such as optical networks and ultra wideband "UWB" wireless networks may be employed to extend computing device interconnection across relatively large areas and, in one exemplary embodiment to couple together a reconfigurable communications infrastructure with reconfigurable circuits on a large scale.

A reconfigurable network may be implemented using any interconnection medium and/or interface configuration that is suitable for providing high bandwidth communications between computing devices. Examples of suitable high bandwidth interconnection mediums include, but are not limited to, any interconnection mediums (e.g., optical, wired or wireless interconnection mediums) having a data transmission capability of greater than or equal to about one gigabit per second. Suitable interface configurations that may be employed to implement the disclosed reconfigurable networks include, but are not limited to, a packet router interface switch matrix communications infrastructure or standard interfacing schemes such as Serial Rapid I/O.

Exemplary implementations of the communication system 44 are disclosed in copending patent application Ser. No. 10/843,226, titled "SYSTEMS AND METHODS FOR INTERCONNECTION OF MULTIPLE FPGA DEVICES," and copending patent application Ser. No. 11/600,934, titled "RECONFIGURABLE COMMUNICATIONS INFRASTRUCTURE FOR ASIC NETWORKS." Both of the referenced copending patent applications are hereby incorporated by reference in their entirety.

The communication destination module 12 and the communication source module 18 may be substantially the same whether the circuit 10 is communicating with similar circuits on a single device, such as an FPGA or ASIC, or whether the circuit 10 is communicating with similar circuits that are external to a device or circuit board on which the circuit 10 is implemented. This aspect of the communications system enables instances of the circuit 10 to be quickly and easily scaled on a single device or on multiple devices to meet the demands of a particular implementation.

Although the present technology has been described with reference to the preferred embodiments illustrated in the attached drawings, it is noted that equivalents may be employed and substitutions made herein without departing from the scope of the subject matter recited in the claims. It will be appreciated, for example, that alternative methods and/or circuits may be used to implement the matrix-vector product module 14 and the liner solver module 16.

Having thus described preferred implementations of the present technology, what is claimed as new and desired to be protected by Letters Patent includes the following:

1. A system for solving linear equations, said system comprising:
   a first circuit comprising—
      a first multiplication module for multiplying a first row of a matrix by a first instance of a vector variable to generate a first product, and
      a first linear solver module for calculating an updated first element of said vector variable using said first product, said first element of said vector variable corresponding to said first row of said matrix;
   a second circuit comprising—
      a second multiplication module for multiplying a second row of said matrix by a second instance of said vector variable to generate a second product, and
      a second linear solver module for calculating an updated second element of said vector variable using said second product, said second element of said vector variable corresponding to said second row of said matrix; and
   an interface module for updating said second instance of said vector variable with said updated first element, and for updating said first instance of said vector variable with said updated second element.

2. The system as set forth in claim 1, wherein said first instance of said vector variable is stored in a first memory location, and said second instance of said vector variable is stored in a second memory location.

3. The system as set forth in claim 2, wherein said interface module asynchronously communicates said first updated element to said second memory location and said second updated element to said first memory location.

4. The system as set forth in claim 1, wherein said interface module simultaneously updates said first instance and said second instance of said vector variable with said updated first element, and simultaneously updates said first instance and said second instance of said vector variable with said updated second element.

5. The system as set forth in claim 1, wherein said first circuit automatically calculates said updated first element of said vector variable each time said interface module updates said first instance of said vector variable with said second updated element, and said second circuit automatically calculates said updated second element of said vector variable each time said interface module updates said second instance of said vector variable with said first updated element.

6. The system as set forth in claim 1, wherein said interface module includes a hard-wired connection between said first circuit and said second circuit.

7. The system as set forth in claim 1, wherein said interface module includes a packet routing system including a packet encoding module and a packet decoding module.

8. The system as set forth in claim 1, wherein said first linear solver subtracts said first product from a first value of a known vector b and multiplies the difference by an inverse of a diagonal of said first row of said matrix, and wherein said second linear solver subtracts said second product from a second value of a known vector b and multiplies the difference by an inverse of a diagonal of said first row of said matrix.

9. A system for solving linear equations, said system comprising:
   a plurality of computing components each comprising—
      a first memory module for storing a plurality of values of a vector variable,
      a second memory module for storing a plurality of values of a row of a matrix,
      a multiplication module for multiplying each of said values of said vector variable stored in said first memory module by one of said matrix values stored in said second memory module, and for summing all of the product values to generate a single updated value of said vector variable, and
      a linear solver for determining an updated value of said vector variable corresponding to said row of said matrix using an output of said computing element, wherein said linear solver subtracts said matrix product from a variable b to generate a first intermediate value, multiplies said first intermediate value by 1/D to generate a $\Delta x$ value, wherein D is a diagonal value corresponding to said matrix row, and adding said $\Delta x$ value to a previous x value to generate a new x value;
   an interface component for communicating a result of each of said linear solvers to said second memory array of each of said computing components, wherein each of said results of said linear solvers represents a different value of said vector variable, and wherein each of said plurality of computing components uses a different row of said matrix.

10. A method for solving linear equations, said method comprising:
   using a first circuit to multiply a first row of a matrix by a first instance of a vector variable to generate a first product;

using said first circuit to calculate an updated first element of said vector variable using said first product, said first element of said vector variable corresponding to said first row of said matrix;

using a second circuit to multiply a second row of said matrix by a second instance of said vector variable to generate a second product;

using said second circuit to calculate an updated first element of said vector variable using said first product, said first element of said vector variable corresponding to said first row of said matrix;

using an interface module to update said second instance of said vector variable with said first updated element, and to update said first instance of said vector variable with said second updated element.

11. The method as set forth in claim 10, further comprising storing said first instance of said vector variable in a first memory location, and storing said second instance of said vector variable in a second memory location.

12. The method as set forth in claim 11, further comprising using said interface module to asynchronously communicate said first updated element to said second memory location said second updated element to said first memory location.

13. The method as set forth in claim 10, further comprising using said interface module to simultaneously update said first instance and said second instance of said vector variable with said first updated element, and using said interface module to simultaneously update said first instance and said second instance of said vector variable with said second updated element.

14. The method as set forth in claim 10, further comprising using said interface module to asynchronously update said first and second instances of said vector variable.

15. The method as set forth in claim 10, further comprising using said first circuit to automatically calculate said updated first element of said vector variable each time said interface module updates said first instance of said vector variable with said second updated element, and using said second circuit to automatically calculate said updated second element of said vector variable each time said interface module updates said second instance of said vector variable with said first updated element.

16. The system as set forth in claim 10, further comprising using said interface module to enable a packet routing system including a packet encoding module and a packet decoding module.

17. The method as set forth in claim 10, further comprising using said first linear solver to subtract said first product from a first value of a known vector b and multiply the difference by an inverse of a diagonal of said first row of said matrix, and using said second linear solver to subtract said second product from a second value of a known vector b and multiply the difference by an inverse of a diagonal of said first row of said matrix.

18. The method as set forth in claim 10, further comprising implementing said first circuit on a first device and implementing said second circuit on a second device.

* * * * *